Patented Sept. 23, 1947

2,427,822

UNITED STATES PATENT OFFICE 2,427,822

PROCESS FOR PREPARING 1-ARYL-2-OXOALKANES

John B. Tindall, Terre Haute, Ind., assignor to Commercial Solvents Corporation, Terre Haute, Ind., a corporation of Maryland No Drawing. Application June 20, 1945, Serial No. 600,653

4 Claims. (Cl. 260—590)

This invention relates to a process for preparing 1-aryl-2-oxoalkanes having the general formula

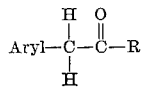

wherein R is hydrogen or an alkyl group.

More particularly it relates to a process for preparing the 1-aryl-2-oxoalkanes by hydrogenating 1-aryl-2-nitro-1-alkenes under controlled conditions and thereafter converting the mixed hydrogenation products to 1-aryl-2-oxoalkanes without intervening recovery or separation of the several hydrogenation products.

The 1-aryl-2-nitro-1-alkenes which are used as the starting material in my process may contain a substituted or unsubstituted aryl group. Some suitable 1-aryl-2-nitro-1-alkenes are: ω-nitrostyrene; 1 - phenyl-2-nitro-1-propene; 1-phenyl - 2 - nitro-1-butene; 1-phenyl-2-nitro-1-pentene; 1-phenyl-2-nitro-1-hexene; 2-nitro-1-(m-methylphenyl)-1-propene; 2-nitro-1-(p-isopropylphenyl)-1-propene and the like.

Arylnitroolefins have been hydrogenated in the past to form aryloxoalkane oximes, mixtures of aryloxoalkanes and arylaminoalkanes or mixtures of all three of these compounds.

It has recently been discovered that arylnitroolefins can be selectively hydrogenated to produce substantal yields of arylnitroalkanes, virtually free of amines, together with quantities of aryloxoalkane oximes and aryloxoalkanes in which catalytic reduction is carried out under controlled conditions in the presence of certain noble metal catalysts, as described in copending application Serial No. 600,654 (P. C. 619-A), in the name of Charles D. Hurd, filed as of even date herewith.

I have now found that these mixed reduction products may all be converted before recovery to the 1-aryl-2-oxoalkanes and the total of the hydrogenated products may be recovered in the form of this single carbonyl product.

In carrying out my invention, the arylnitroolefin, together with an inert, neutral solvent and a small quantity of a noble metal catalyst such as platinum or palladium is placed in a pressure vessel. The vessel is closed, heated, and hydrogen is passed into the vessel under pressure until hydrogen absorption appears substantially to cease. The hydrogenation products are then separated from the catalyst and the inert solvent is removed.

As a liquid reaction medium, any suitable inert neutral solvent may be used, such as water, alcohols, ketones, benzene, toluene and the like.

The temperature of hydrogenation should be as low as is consistent with adequate hydrogen absorption, as higher temperatures appear to promote formation of some quantities of undesired amines which tend not only to lower the overall yields of combined products, but also combine with them in such a way as to make separation in the usual way difficult. A temperature of at least about 15° C. is necessary for reasonably rapid hydrogenation, and up to about 40° C. may generally be used before the undesired, interfering amine begins to form. I, therefore, prefer to carry out my hydrogenation between these two temperature limits of about 15° to 40° C. to obtain high overall yields of combined products in the form of arylnitroalkanes, aryloxoalkanes and aryloxoalkane oximes.

The hydrogenation is carried out under pressures, and this factor is not particularly critical, pressures between about 15 and 500 lbs./sq. inch being satisfactory, depending somewhat on the catalyst employed, ranges between about 15 and 100 lb./sq. inch being most satisfactory for platinum catalyst while a range between about 200 and 500 lb./sq. inch is most satisfactory for use with palladium catalyst. The overall yields of the three products obtained is usually high, ranging usually from about 70 to 90%, although the yield from the lower member—nitrostyrene—may be somewhat lower because of its tendency to polymerize and form tars.

In carrying out the recovery procedure according to my invention, I treat the crude reaction product, which has been freed from catalyst, with a base such as sodium hydroxide to convert the arylnitroalkane to the sodium aci nitroalkane. The mixture is gently heated and agitated to dissolve the aci salt. The solution is then treated with sufficient acid such as sulfuric acid to neutralize the caustic, and to leave the solution slightly acid, whereupon the aci salt of the arylnitroalkane is converted to aryloxoalkane. The treated reaction products may then be distilled in the presence of the acid which serves to hydrolyze the oxime also to the aryloxoalkane, and all the products are thus recovered as the aryloxoalkane.

Example I

A mixture of 200 parts of 1-phenyl-2-nitro-1-propene, 600 parts of water and 2 parts of 5% palladium on charcoal was placed in a pressure vessel. The vessel was closed and hydrogen was passed in at a temperature between 28 and 36° C. at about 500 lbs./sq. inch pressure until hydrogen absorption substantially ceased. The hydrogenation was discontinued, the catalyst filtered out and to the filtered product (water and oil) was added a solution of 59 parts of sodium hydroxide in 500 parts of water. The mixture was agitated and heated to 65° C. at which point most of the oil went into solution. There was some undissolved oil. The mixture was added with agitation to a solution of 185 parts of concentrated sulfuric acid in 1180 parts of water at 0–5° C. The reaction mixture was then distilled until oil stopped coming over. There were 2 parts of tarry material left in the residue. The oil layer of the distillate was fractionated to obtain 140.4 parts of phenylacetone boiling at 106–110° (19 mm.) corresponding to a yield of 85.3%.

*Example II*

A mixture of 181.2 parts of 1-phenyl-2-nitro-1-butene, 600 parts of water and 2 parts of 5% palladium on charcoal were placed in a pressure vessel. The vessel was closed and hydrogen was passed in at a temperature between 28 and 36° C. at about 500 lbs./sq. inch pressure until hydrogen absorption substantially ceased. The hydrogenation was discontinued, the catalyst filtered out and to the remainder was added a solution of 48 parts of sodium hydroxide in 300 parts of water. The mixture was heated to 80° C. with agitation, cooled and run into a solution of 150 parts of concentrated sulfuric acid in 960 parts of water at 5° C. The mixture was distilled through a column and 94.5 parts of phenyl-butanone (benzyl ethyl ketone) was recovered, corresponding to a yield of 62%. The ketone product had a refractive index $n_D^{20}$ of 1.513, a specific gravity at 20°/20° C. of 0.991, a purity of 98.3%, and a boiling point at 18 mm. of 114–117° C.

*Example III*

A mixture of 149.8 parts of 1-phenyl-2-nitro-1-pentene, 600 parts of water and 2 parts of 5% palladium on charcoal was placed in a pressure vessel and hydrogenated as described in Examples I and II at temperatures between about 25° C. and 35° C. at 500 lbs./sq. inch pressure. After hydrogenation had substantially ceased the vessel was opened, the catalyst filtered off. Into the filtered product, oil and water, was added a solution of 41 parts of sodium hydroxide in 350 parts of water. The mixture was agitated and gradually heated to a temperature of 95° C. The mixture was cooled and dropped with stirring to a solution of 130 parts of concentrated sulfuric acid in 830 parts of water at 5° C. Two layers separated and the oil layer was fractionated and 88.2 parts of phenyl-pentanone (benzyl propyl ketone) was obtained corresponding to a yield of 73.5%. The product had a refractive index $n_D^{20}$ of 1.507, a specific gravity at 20°/20° C. of 0.973, a purity of 100% and a boiling point at 18 mm. pressure of 127–130° C.

*Example IV*

A mixture of 168 parts of 2-nitro-1-(m-methyl-phenyl)-1-propene, 600 parts of methanol and 3 parts of 5% palladium on charcoal was placed in a pressure vessel and hydrogenated at 300 lbs. hydrogen pressure and at 20–21° C. The product from the pressure vessel was filtered, neutralized and distilled to remove methanol, then treated with 50 parts of sodium hydroxide in 1,000 parts of water. The mixture was heated to a temperature of about 75° C. and was then cooled and dropped with stirring to a solution of 350 parts of concentrated sulfuric acid in 1200 parts of water at 2° C. Two liquid layers separated and the oil layer was fractionated and 92 parts of 1-(m-methylphenyl)-2-propanone corresponding to a yield of 65% was recovered. The product had a boiling point of 118 to 119° C. at 18 mm. pressure.

*Example V*

A mixture of 142.7 parts of 2-nitro-1-(p-isopropylphenyl)-1-propene, 500 parts of methanol and 3 parts of 5% palladium on charcoal was placed in a pressure vessel and hydrogenated at 18–20° C. and 300 lbs. pressure. The product was filtered, neutralized with hydrochloric acid, and distilled until free of methanol. The remainder was treated with 32 parts of sodium hydroxide in 600 parts of water. The mixture was heated to about 75° C. then cooled and dropped with stirring into a solution of 185 parts of concentrated sulphuric acid dissolved in 640 parts of water at 0° C., the mixture being cooled during the addition by means of an ice salt bath. Two liquid layers separated and the oil layer was fractionated. From this mixture there was recovered 67 parts of 1-(p-isopropylphenyl)-2-propanone having a boiling point of 141 to 143° C. at 23 mm. pressure. This corresponded to a yield of 56%.

While the above describes the preferred embodiments of my invention, it will be understood that modifications may be made and departures therefrom within the scope of the specification and claims.

What is claimed is:

1. In a process for preparing 1-aryl-2-oxoalkanes having the general formula

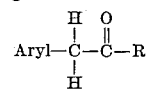

wherein R is a member selected from the group consisting of hydrogen and alkyl groups, the steps which comprise subjecting a 1-aryl-2-nitro-1-alkene to selective catalytic hydrogenation at temperatures below about 40° C., in a neutral liquid and in the presence of a noble metal catalyst, selected from the group consisting of platinum and palladium, whereby a mixture of 1-aryl-2-oxoalkane, 1-aryl-2-oxoalkane oxime, and 1-aryl-2-nitroalkane is formed, treating the mixture with a base under conditions favoring the conversion of the 1-aryl-2-nitroalkane to its aci salt, adding the mixture thus obtained to a strong mineral acid solution containing an excess of acid over that required to neutralize the base and hydrolyzing the mixture, whereby the said aci salt and the 1-aryl-2-oxoalkane oxime are both converted to 1-aryl-2-oxoalkane and recovering the 1-aryl-2-oxoalkane.

2. In a process for preparing phenylacetone, the steps which comprise subjecting 1-phenyl-2-nitro-1-propene to selective catalytic hydrogenation at temperatures below about 40° C. in a neutral liquid and in the presence of a noble metal catalyst, selected from the group consisting of platinum and palladium, whereby a mixture of phenylacetone, phenylacetoneoxime and 1-phenyl-2-nitropropane is formed, treating the mixture with a base under conditions favoring the conversion of the phenylnitropropane to its aci salt, adding the mixture thus obtained to a strong mineral acid solution containing an excess of acid over that required to neutralize the base and hydrolyzing the mixture, whereby the said aci salt and the phenylacetoneoxime are both converted to phenylacetone and recovering the phenylacetone.

3. In a process for preparing 1-phenyl-butanone, the steps which comprise subjecting 1-phenyl-2-nitro-1-butene to selective catalytic hydrogenation at temperatures below about 40° C. in a neutral liquid and in the presence of a noble metal catalyst, selected from the group consisting of platinum and palladium, whereby a mixture of 1-phenyl-2-butanone, 1-phenyl-2-butanone oxime, and 1-phenyl-2-nitrobutane is formed, treating the mixture with a base under conditions favoring the conversion of the 1-phenyl-2-nitrobutane to its aci salt, adding the mixture thus obtained to a strong mineral acid solution containing an excess of acid over that required to neutralize the base and hydrolyzing the mixture, whereby the aci salt of 1-phenyl-2-nitrobutane and the 1-phenyl-2-butanone oxime are both converted to 1-phenyl-2-butanone and recovering the 1-phenyl-2-butanone.

4. In a process for preparing 1-phenyl-2-pentanone, the steps which comprise subjecting 1-phenyl-2-nitro-1-pentene to selective catalytic hydrogenation at temperatures below about 40° C. in a neutral liquid and in the presence of a noble metal catalyst, selected from the group consisting of platinum and palladium, whereby a mixture of 1-phenyl-2-pentanone, 1-phenyl-2-pentanone oxime, and 1-phenyl-2-nitropentane is formed, treating the mixture with a base under conditions favoring the conversion of the 1-phenyl-2-nitropentane to its aci salt, adding the mixture thus obtained to a strong mineral acid solution containing an excess of acid over that required to neutralize the base and hydrolyzing the mixture, whereby the aci salt of 1-phenyl-2-nitropentane and the 1-phenyl-2-pentanone oxime are both converted to 1-phenyl-2-pentanone and recovering the 1-phenyl-2-pentanone.

JOHN B. TINDALL.

REFERENCES CITED

The following references are of record in the file of this patent:

UNITED STATES PATENTS

| Number | Name | Date |
| --- | --- | --- |
| 2,233,823 | Susie | Mar. 4, 1941 |
| 2,145,388 | Carter | Jan. 31, 1939 |
| 2,370,185 | Nygaard | Feb. 7, 1945 |

Certificate of Correction

Patent No. 2,427,822.                                                                  September 23, 1947.

JOHN B. TINDALL

It is hereby certified that error appears in the printed specification of the above numbered patent requiring correction as follows: Column 5, lines 7 and 8, claim 3, for "1-phenyl-butanone" read *1-phenyl-2-butanone*; and that the said Letters Patent should be read with this correction therein that the same may conform to the record of the case in the Patent Office.

Signed and sealed this 6th day of January, A. D. 1948.

[SEAL]

THOMAS F. MURPHY,
*Assistant Commissioner of Patents.*